United States Patent

Rozman et al.

[11] Patent Number: 5,132,894
[45] Date of Patent: Jul. 21, 1992

[54] ELECTRIC POWER GENERATING SYSTEM WITH ACTIVE DAMPING

[75] Inventors: Gregory I. Rozman; Alexander Cook, both of Rockford; Albert L. Markunas, Roscoe; Madan L. Bansal; Shan-Chin Tsai, both of Rockford, all of Ill.

[73] Assignee: Sundstrand Corporation, Rockford, Ill.

[21] Appl. No.: 580,076

[22] Filed: Sep. 10, 1990

[51] Int. Cl.[5] .................................................. H02H 7/00
[52] U.S. Cl. .......................................... 363/51; 363/35; 363/47
[58] Field of Search ................... 363/37, 39, 45, 46, 363/51, 47, 48, 126; 323/209, 210, 211

[56] References Cited

U.S. PATENT DOCUMENTS

| | | | |
|---|---|---|---|
| 3,559,028 | 1/1971 | Studtmann et al. | 363/16 |
| 3,849,677 | 11/1974 | Stacey et al. | 307/295 |
| 4,063,306 | 12/1977 | Perkins et al. | 363/17 |
| 4,195,334 | 3/1980 | Perry et al. | 363/44 |
| 4,236,201 | 11/1980 | Okado | 363/138 |
| 4,292,545 | 9/1981 | Hingorani | 307/102 |
| 4,550,285 | 10/1985 | Kugler et al. | 323/343 |
| 4,709,317 | 11/1987 | Iizuka et al. | 363/37 |
| 4,730,242 | 3/1988 | Divan | 363/37 |

Primary Examiner—Peter S. Wong
Attorney, Agent, or Firm—Wood, Phillips, VanSanten, Hoffman & Ertel

[57] ABSTRACT

The problem of filtering DC power on a DC bus (46) in an electrical power generating system (10) is resolved using an active damper circuit (44). The active damper circuit (44) comprises a capacitor (CD) and a switching circuit (70) for alternately switching the capacitor (CD) into and out of parallel relationship with the DC bus (46).

12 Claims, 3 Drawing Sheets

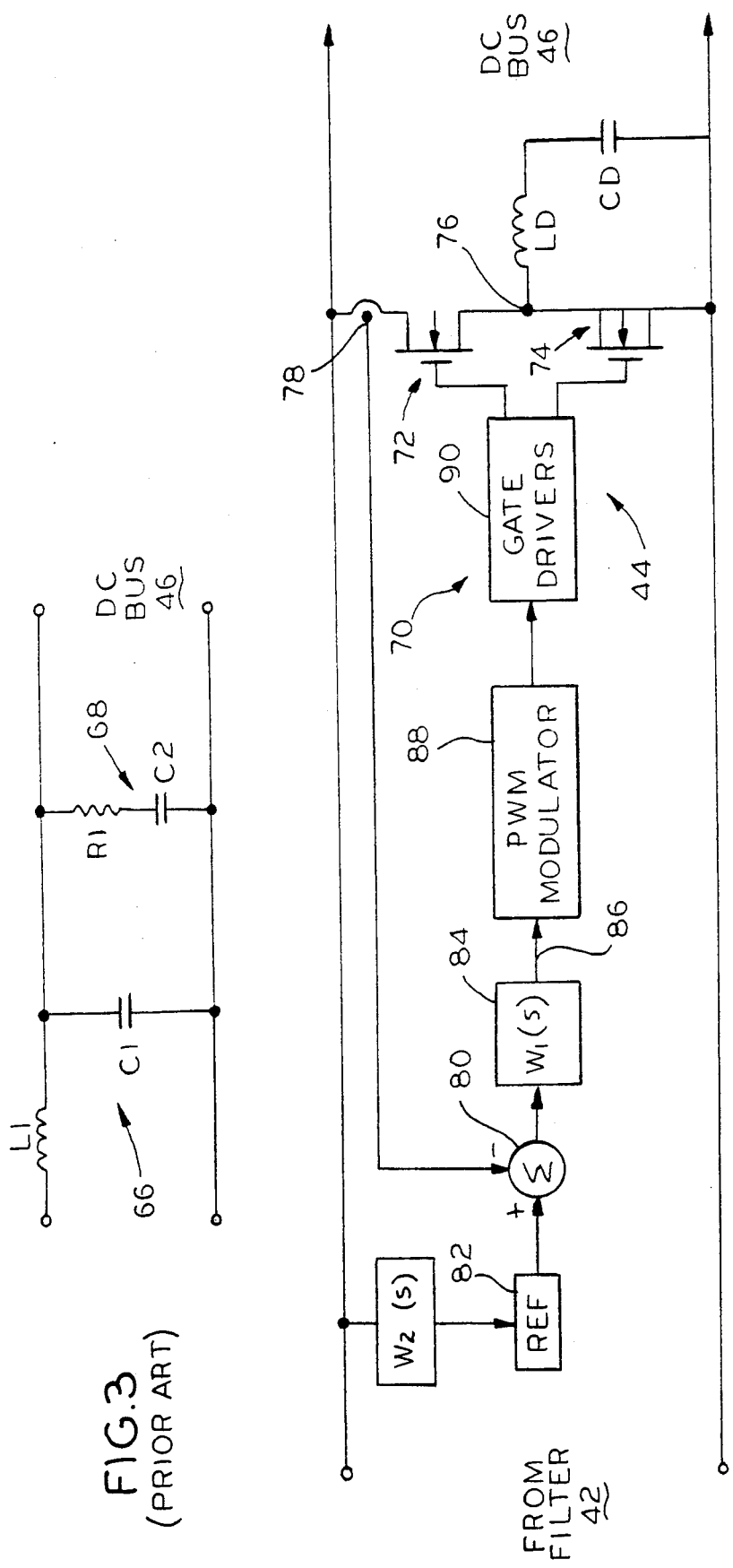

ELECTRIC POWER GENERATING SYSTEM WITH ACTIVE DAMPING

FIELD OF THE INVENTION

This invention relates to electrical power systems and, more particularly, to an improved damper circuit therefor.

BACKGROUND OF THE INVENTION

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil.

Aircraft power systems include plural loads to be powered. Such loads may include avionics DC loads, such as electronic systems, pulsating loads, such as radar, and AC loads, such as fans. The generator comprises a DC exciter followed by a rotating rectifier and a synchronous main generator. The AC power developed in the main generator stator coil is rectified and filtered by a ripple filter to provide DC power on a DC link. This power, which may be on the order of 270 volts DC, can be provided directly to DC loads, through DC-DC converter circuits to DC loads, or through an inverter circuit to an AC bus for powering AC loads.

The DC-DC converter circuits, discussed above, act as nearly constant power loads to the electrical power system. Any increase in voltage from the power system results in a decrease in current because the load on the supply normally demands constant current from the tightly regulated DC voltage. These negative impedance characteristics create the possibility of unstable operation of a 270 volt DC system.

The purpose of the ripple filter is to reduce the generator ripple on the DC link. To reduce the possibility of unstable operation, a damper circuit may also be included. The most commonly used damper circuit is an RC circuit connected across the DC link. The damper circuit reduces the Q of the ripple filter, reducing the peaking and output impedance. The resistor performs the damping of the filter, and the capacitor blocks the DC portion of the input voltage to reduce dissipation in the resistor. The blocking capacitor is typically larger than the ripple filter capacitor since its impedance must be small enough at the resonance of the RC filter to allow the resistor to provide effective damping at this frequency. Owing to size and weight consideration in aircraft design, it is desirable to minimize the size and weight of the ripple filter, and the damper circuit.

The present invention is intended to solve one or more of the problems discussed above in a novel and simple manner.

SUMMARY OF THE INVENTION

In accordance with the present invention, an electrical power generating system has reduced size and weight by utilizing an active damper circuit.

Broadly, there is disclosed herein an electrical power generating system (EPGS) for developing power on a DC bus including means for generating input power. A rectifier is connected to the generating means for converting the input power to DC power. A ripple filter is connected between the rectifier and the DC bus, and a damper circuit is connected across the DC bus. The damper circuit comprises a capacitor and a switching means for controlling energy flow between the capacitor and the ripple filter to reduce Q of the ripple filter.

In accordance with one aspect of the invention, an inductor is connected in series with the capacitor.

It is a feature of the invention that the switching means comprises a pair of alternately switched transistors.

It is a further feature of the invention that the switching means comprises a first transistor coupling the capacitor into parallel relationship with the ripple filter and a second transistor connected across the capacitor in series with the first transistor.

It is a further feature of the invention that the switching means comprises a drive circuit for alternately gating the first and second transistors.

It is yet another feature of the invention that the switching means comprises means for sensing damper circuit current and means responsive to the sensed current for controlling the drive circuit.

More specifically, an active damper circuit is connected in parallel to the ripple filter capacitor to reduce the Q of the filter, reducing the peaking and output impedance. The active damper comprises a summing circuit which compares a damper current reference to sensed damping current to develop an error signal supplied to a compensation block. The compensated error signal is pulse width modulated and applied to a pair of gate drivers which alternately switch an L-C network. The inductor limits the current to the capacitor, allowing energy transfer to be performed with low loss. The current loop around the active damper improves the speed and accuracy of the circuit.

The use of the above-described active damping circuit reduces the size of the ripple filter, and more specifically removes the requirement of a blocking capacitor by replacing a conventional capacitive R-C damper with an active damper.

Further features and advantages of the invention will readily be apparent from the specification and from the drawings.

BRIEF DESCRIPTION OF THE DRAWINGS

FIG. 3 is a schematic diagram illustrating a prior art ripple filter circuit and damper circuit; and FIG. 4 is a partial schematic, block diagram of a damper circuit according to the invention;

DESCRIPTION OF THE INVENTION

Figure 1:
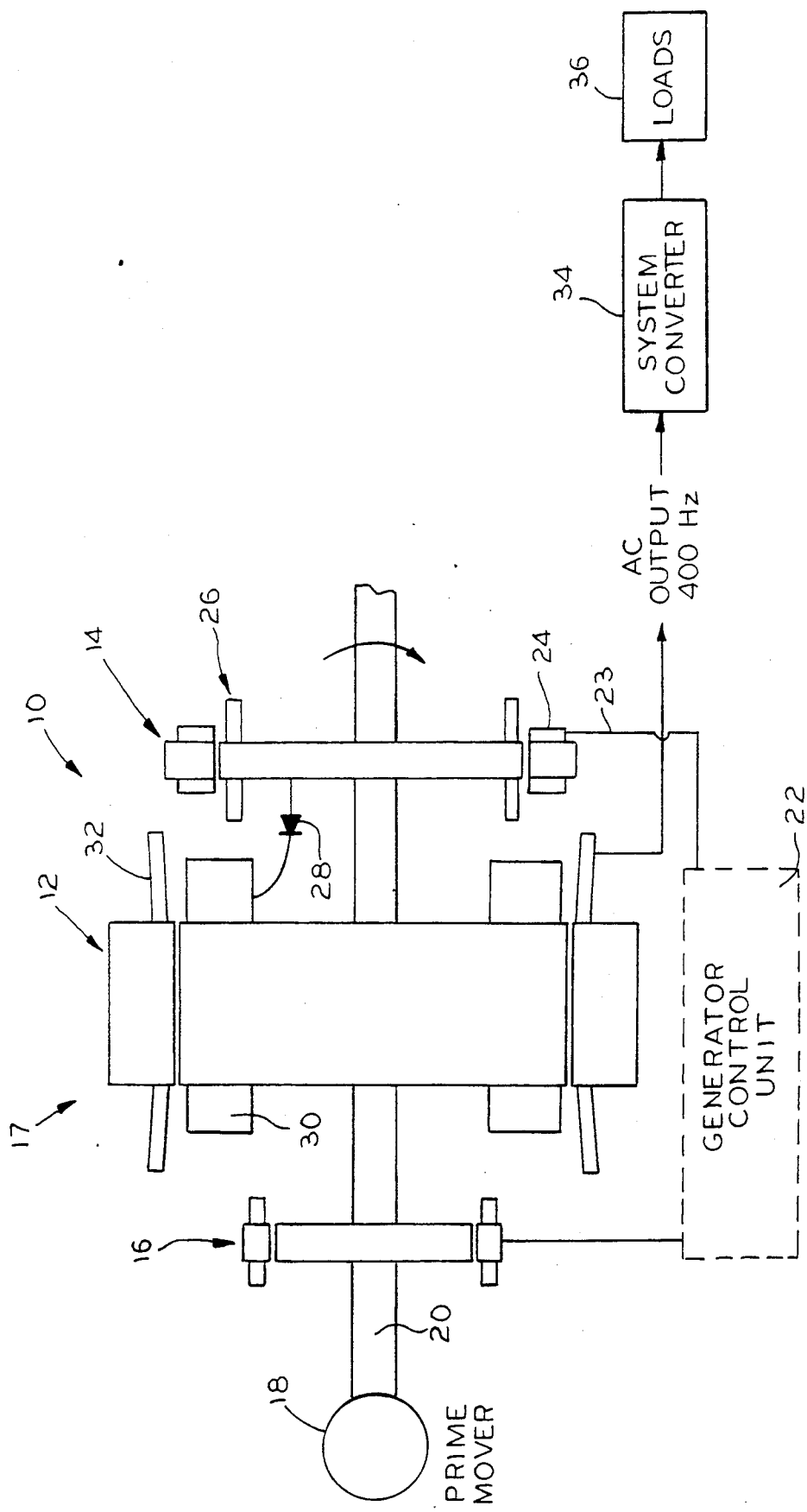
FIG. 1 is a combined diagrammatic illustration-block diagram of an electrical power generating system according to the invention.

Referring first to FIG. 1, an electrical power generating system (EPGS) 10 includes a main generator 12, an exciter 14 for providing main field current to the main generator 12 and a permanent magnet generator (PMG) 16. Each of the main generator 12, exciter 14, and PMG 16, referred to collectively as a brushless generator 17, are driven by a prime mover 18 through a common shaft 20.

A generator control unit (GCU) 22 receives the power developed by the PMG 16 and delivers a controlled current on a line 23 to a DC field winding 24 of the exciter 14. As is conventional in brushless power systems, rotation of the shaft 20 by the prime mover 18 results in generation of a polyphase voltage in armature windings 26 of the exciter 14. This polyphase voltage is rectified by a rotating rectifier bridge, illustrated generally at 28, and the rectified power is coupled to a field winding 30 of the main generator 12. The current in the field winding 30 and the rotation of the shaft 20 sets up a rotating magnetic field in the space occupied by a set of main generator stator windings 32. The stator windings 32 develop polyphase AC output power which is delivered to a system converter 34 for powering loads 36.

In a typical application, the prime mover 18 is the main engine in an aircraft, and the system converter 34 is part of a power source which develops 270 volt DC power for powering high power loads, and avionics DC loads, and for providing AC power at, for example, 400 Hz for supplying AC loads.

Figure 2:
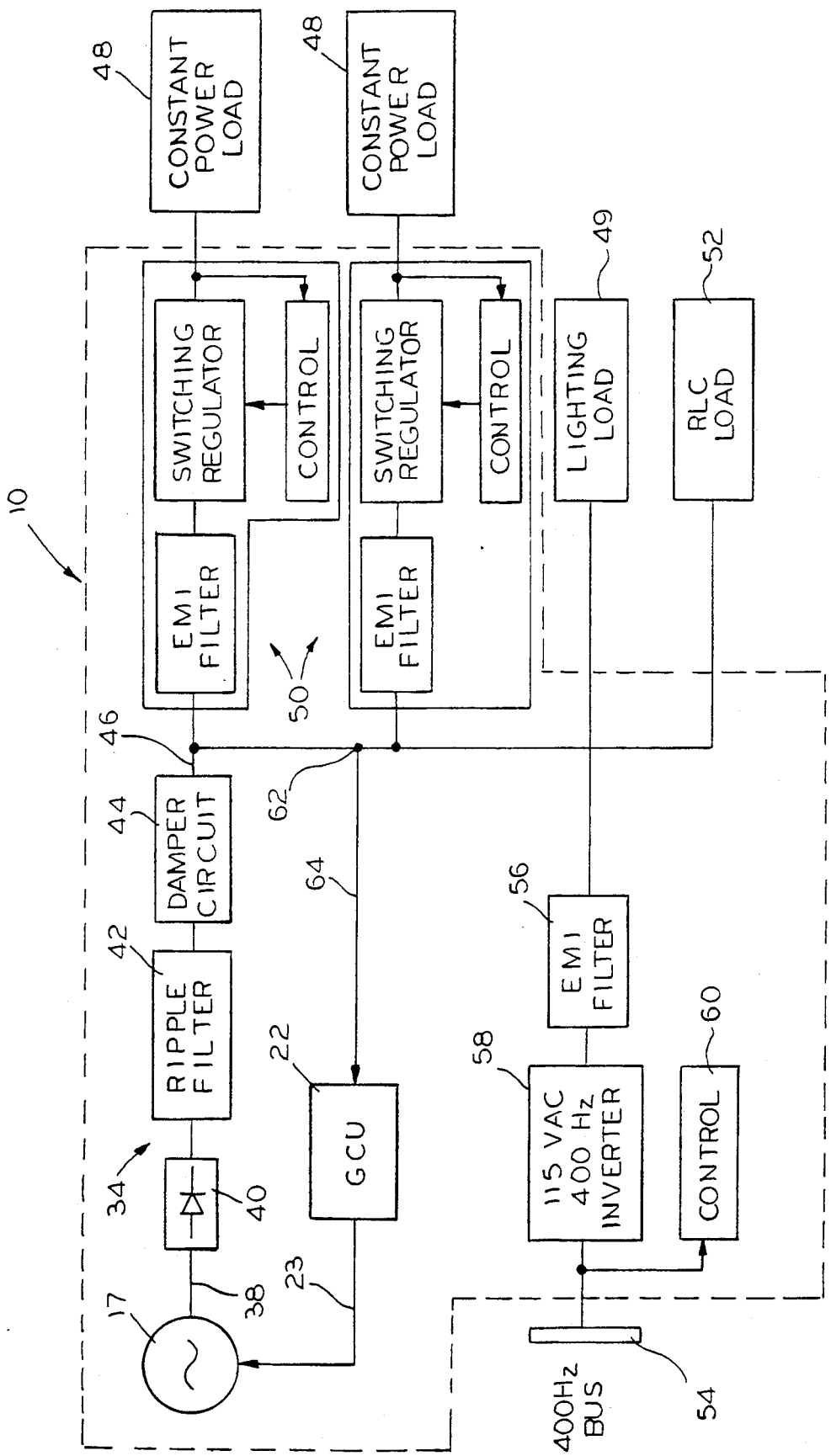
FIG. 2 is a generalized, more detailed, block diagram of an EPGS according to the invention.

Referring now to FIG. 2, the EPGS 10 is illustrated in greater detail in block diagram form.

The generator 17 develops polyphase output power on a feeder 38 to the system converter 34. The system converter 34 includes an AC/DC converter in the form of a full wave bridge rectifier 40 of conventional construction which is operable to convert three-phase AC power to DC power. The DC power is supplied through a ripple filter 42 and a damper circuit 44 to develop DC power on a DC link, or bus 46. The ripple filter 42 reduces generator ripple on the DC bus 46. The damper circuit 44 reduces the Q of the ripple filter 42 and reduces the peaking and output impedance.

The DC power on the bus 46 may comprise, for example, 270 volt DC power which is used for powering plural loads in, for example, an aircraft. These loads may comprise various constant power loads 48, such as avionics DC loads or pulsating loads such as radar, lighting loads 49, RLC loads 52 or AC loads connected to a 400 Hz AC bus 54.

The constant power loads 48 are connected to the DC bus 46 through regulating circuits 50 which are used for developing DC voltages at a select level and may be of any conventional form. The lighting loads 49 and RLC loads 52 may be connected directly to the DC bus 46. The AC bus 54 is connected to the DC bus 46 via an EMI filter 56 and an inverter circuit 58. The inverter circuit 58 may comprise a voltage source inverter having six power switches connected in a three-phase bridge configuration for developing AC power in accordance with drive signals received from an inverter control 60. The switching of the power switches in the inverter 58 may be controlled in any known manner by the control 60 to control power to the AC bus 54.

A sensor 62 senses a characteristic of power on the DC bus 46. This sensor 62 may sense output voltage or current, as necessary. The sensor 62 is connected via a line 64 to the GCU 22. The GCU 22 in turn provides voltage regulation by controlling current to the exciter DC field winding 24, see FIG. 1, as discussed above to control at the point of regulation (POR).

With reference to FIG. 3, a schematic diagram illustrates a typical prior art ripple filter 66 and damper circuit 68. The ripple filter comprises an L-C network consisting of an inductor L1 and capacitor C1 configured to form a low-pass filter to reduce the generator ripple on the DC bus 46. The damper circuit 68 comprises a series R-C network in parallel to the ripple filter capacitor C1 to reduce the Q of the filter, reducing the peaking and output impedance. The damper circuit 68 includes a resistor R1 to perform the damping of the filter 66, and a capacitor C2 blocks the DC portion of the input voltage to reduce dissipation in the resistor R1. The blocking capacitor C2 is typically larger than the ripple filter capacitor C1 since its impedance must be small enough at the L1-C1 resonance to allow proper damping. As is well known, the damper circuit 68 comprises a passive network.

In accordance with the invention, the passive damper circuit 68 is replaced with an active damper circuit eliminating the blocking capacitor which allows reduction in the size of the damper circuit.

With reference to FIG. 4, a partial block diagram-schematic illustrates an active damper circuit 44 in accordance with the invention.

The damper circuit 44 is connected between the ripple filter 42 and the DC bus 46 and comprises a capacitor CD and switching circuit 70 for alternately switching the capacitor CD into and out of parallel relationship with the ripple filter 42 to reduce Q of the ripple filter 42.

The switching circuit 70 includes first and second field effect transistors (FETs) 72 and 74 connected in series across the DC bus 46. The source of the first FET 72 is connected to the drain of the second FET 74 at a junction 76. An inductor LD is connected in series with the capacitor CD between the junction 76 and the negative side of the DC bus 46. The inductor LD limits the current of the switched capacitor CD.

A current sensor 78 is connected between the plus side of the DC bus 46 and the drain of the first FET 72 to sense damper current. The current sensor 78 is connected to a summer 80 which also receives a current reference value from a block 82. The reference value represents a desired damper current value.

In the disclosed embodiment, the required damping current becomes the reference and is given by $V_{IN}*W_2(s)$, where $W_2(s)$ emulates the response of R1 and C2 (FIG. 3). Hence, there is no DC current flow in the damper. Since:

$$W_2(s) = \frac{1}{R_1 + 1/(sC_2)}$$

Then:

$$I_{IN} = \frac{V_{IN}}{R_1 + 1/(sC_2)}$$

Therefore:

$$I_{REF} = \frac{V_{IN}}{R_1 + 1/(sC_2)} = I_{R1}$$

The output of the summer 80 is an error signal representing the difference between the actual damper current and the desired damper current which is applied to a compensation block 84. The compensation block 84 may comprise a proportional-integral algorithm which develops a compensated error signal on a line 86 which is applied to a pulse width modulator (PWM) 88. The output of the PWM modulator 88 is provided to a gate driver circuit 90 which is connected to the gate of each of the FETs 72 and 74 for driving the same.

The gate driver circuit 90 is operable to alternately gate the FETs 72 and 74. Particularly, when the first FET 72 is conducting, the second FET 74 is non-conducting, and vice versa. The frequency of the switching is determined by the frequency of the PWM modulator 88 with the duty cycle for each FET 72 and 74 being selected in accordance with the pulse width from the PWM modulator 88. More particularly, the pulse is determined in accordance with the compensated error signal on the line 86. For example, if the damper current as sensed by the sensor 78 decreases, then the error signal increases resulting in a corresponding compensated error signal increase. The increase in the value of the compensated error signal increases the on time of the first FET 72 relative to the on time of the second FET 74 so that the capacitor C2 is switched into parallel relation with the DC bus 46 for a longer relative time period during each cycle.

In accordance with the invention, the size of the capacitor CD is determined by the damping current required, the allowable voltage swing on CD, and the frequency at which the damper is required to function. The current loop around the active damper is further applicable to improve reliability and accuracy of the circuit.

The disclosed embodiment of the invention illustrates the broad inventive concepts comprehended hereby.

We claim:

1. An electrical power generating system (EPGS) for developing power on a DC bus comprising:
    means for generating power;
    a rectifier connected to the generating means for converting the generated power to DC power;
    a ripple filter connected to said rectifier; and
    a damper circuit connected between said ripple filter and the DC bus, said damper circuit comprising a capacitor and switching means for alternately connecting said capacitor in parallel relationship with said ripple filter and shorting said capacitor to reduce Q of said ripple filter.

2. The EPGS of claim 1 wherein said damper circuit further comprises an inductor connected in series with said capacitor.

3. An electrical power generating system (EPGS) for developing power on a DC bus comprising:
    means for generating power;
    a rectifier connected to the generating means for converting the generated power to DC power;
    a ripple filter connected to said rectifier; and
    a damper circuit connected between said ripple filter and the DC bus, said damper circuit comprising a capacitor and switching means for alternately switching said capacitor into and out of parallel relationship with said ripple filter to reduce Q of said ripple filter, wherein said switching means comprises a pair of alternately switched transistors.

4. An electrical power generating system (EPGS) for developing power on a DC bus comprising:
    means for generating power;
    a rectifier connected to the generating means for converting the generated power to DC power;
    a ripple filter connected to said rectifier; and
    a damper circuit connected between said ripple filter and the DC bus, said damper circuit comprising a capacitor and switching means for alternately switching said capacitor into and out of parallel relationship with said ripple filter to reduce Q of said ripple filter, wherein said switching means comprises a first transistor coupling said capacitor into parallel relationship with said ripple filter and a second transistor connected across said capacitor in series with said first transistor.

5. The EPGS of claim 4 wherein said switching means further comprises a drive circuit for alternately gating said first and second transistors.

6. The EPGS of claim 5 wherein said switching means comprises means for sensing damper circuit current and means responsive to said sensed current for controlling said drive circuit.

7. An electrical power generating system (EPGS) for developing power on a DC bus comprising:
    means for generating AC output power;
    a rectifier connected to the generating means for converting AC power to DC power;
    a ripple filter connecting said rectifier to said DC bus; and
    a damper circuit connected across the DC bus, said damper circuit comprising a capacitor, electrically controlled switches alternately connecting said capacitor in parallel relationship with said ripple filter and shorting said capacitor, and a control circuit for controlling operation of said switches.

8. The EPGS of claim 7 wherein said damper circuit further comprises an inductor connected in series with said capacitor.

9. An electrical power generating system (EPGS) for developing power on a DC bus comprising:
    means for generating AC output power;
    a rectifier connected to the generating means for converting AC power to DC power;
    a ripple filter connecting said rectifier to said DC bus; and
    a damper circuit connected across the DC bus, said damper circuit comprising a capacitor, electrically controlled switches alternately switching said capacitor into and out of parallel relationship with said ripple filter, and a control circuit for controlling operation of said switches, wherein said switches comprises a pair of alternately switched transistors.

10. An electrical power generating system (EPGS) for developing power on a DC bus comprising:
    means for generating AC output power;
    a rectifier connected to the generating means for converting AC power to DC power;
    a ripple filter connecting said rectifier to said DC bus; and
    a damper circuit connected across the DC bus, said damper circuit comprising a capacitor, electrically controlled switches alternately switching said capacitor into and out of parallel relationship with said ripple filter, and a control circuit for controlling operation of said switches, wherein said switches comprises a first transistor coupling said capacitor into parallel relationship with said ripple filter and a second transistor connected across said capacitor in series with said first transistor.

11. The EPGS of claim 10 wherein said control circuit comprises a drive circuit for alternately gating said first and second transistors.

12. The EPGS of claim 11 wherein said control circuit comprises means for sensing damper circuit current and means responsive to said sensed current for controlling said drive circuit.

* * * * *